United States Patent
Yoon et al.

(10) Patent No.: US 9,758,058 B2
(45) Date of Patent: Sep. 12, 2017

(54) EMERGENCY START METHOD AND SYSTEM FOR FUEL CELL-POWERED VEHICLE

(71) Applicant: Hyundai Motor Company, Seoul (KR)

(72) Inventors: Sung Gone Yoon, Suwon-si (KR); Kyu Il Lee, Yongin-si (KR); Kyung Won Suh, Seoul (KR); Seon Hak Kim, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 264 days.

(21) Appl. No.: 14/509,734

(22) Filed: Oct. 8, 2014

(65) Prior Publication Data

US 2015/0336471 A1 Nov. 26, 2015

(30) Foreign Application Priority Data

May 21, 2014 (KR) ........................ 10-2014-0060935

(51) Int. Cl.
| | |
|---|---|
| *H01M 8/04* | (2016.01) |
| *B60L 11/18* | (2006.01) |
| *H01M 8/04223* | (2016.01) |
| *H01M 8/04664* | (2016.01) |
| *H01M 8/04746* | (2016.01) |
| *H01M 8/04537* | (2016.01) |

(Continued)

(52) U.S. Cl.
CPC ..... *B60L 11/1885* (2013.01); *H01M 8/04223* (2013.01); *H01M 8/04225* (2016.02); *H01M 8/04302* (2016.02); *H01M 8/04626* (2013.01); *H01M 8/04686* (2013.01); *H01M 8/04753* (2013.01); *H01M 2250/20* (2013.01); *Y02T 90/32* (2013.01)

(58) Field of Classification Search
CPC ......... H01M 8/04626; H01M 8/04302; H01M 8/04225; H01M 8/04753; H01M 8/04686; H01M 8/07223; B60L 11/1885
USPC .............................. 429/428, 429, 430; 701/22
See application file for complete search history.

(56) References Cited

U.S. PATENT DOCUMENTS

| | | | |
|---|---|---|---|
| 2004/0180243 A1* | 9/2004 | Pearson ............ | H01M 8/04089 429/430 |
| 2005/0158601 A1* | 7/2005 | Skala ................ | H01M 8/04231 429/429 |

(Continued)

FOREIGN PATENT DOCUMENTS

| | | |
|---|---|---|
| JP | 2001-266917 A | 9/2001 |
| JP | 2007-059218 A | 3/2007 |

(Continued)

OTHER PUBLICATIONS

Korean Notice of Allowance issued in Korean Application No. 10-2014-0060935 dated Sep. 25, 2015.

*Primary Examiner* — Sean P Cullen
(74) *Attorney, Agent, or Firm* — McDermott Will & Emery LLP

(57) ABSTRACT

An emergency start method for a fuel cell-powered vehicle includes starting the vehicle and detecting an abnormal state of a power supply system of an air blower upon the start of the vehicle. If the power supply system of the air blower is in the abnormal state, an air-check valve of a fuel cell opens. Hydrogen is supplied to the fuel cell, and the air blower operates with power generated from the fuel cell and an emergency start system.

9 Claims, 3 Drawing Sheets

(51) Int. Cl.
*H01M 8/04302* (2016.01)
*H01M 8/04225* (2016.01)

(56) References Cited

U.S. PATENT DOCUMENTS

| | | | | |
|---|---|---|---|---|
| 2005/0186454 A1* | 8/2005 | Clingerman | ...... | H01M 8/04223 429/429 |
| 2012/0053766 A1* | 3/2012 | Ham | ...... | B60L 3/0053 701/22 |

FOREIGN PATENT DOCUMENTS

| | | | | |
|---|---|---|---|---|
| JP | 2007-280755 A | 10/2007 | | |
| JP | 2014-041808 A | 3/2014 | | |
| KR | 10-2004-0003573 A | 1/2004 | | |
| KR | 10-2008-0086941 A | 9/2008 | | |
| KR | 10-2009-0008754 A | 1/2009 | | |
| KR | 10-2012-0060609 A | 6/2012 | | |
| WO | WO 2012115605 A1 * | 8/2012 | ........ | H01M 8/04619 |

* cited by examiner

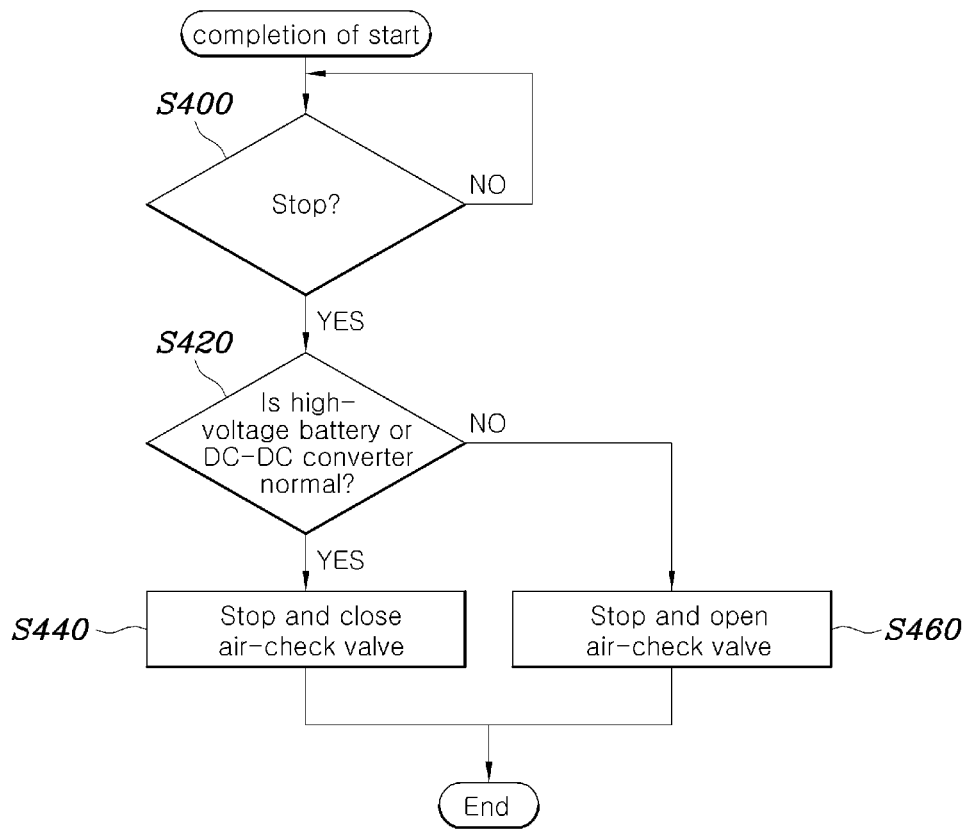

EMERGENCY START METHOD AND SYSTEM FOR FUEL CELL-POWERED VEHICLE

CROSS REFERENCE TO RELATED APPLICATION

The present application claims the benefit of priority to Korean Patent Application Number 10-2014-0060935 filed on May 21, 2014, the entire contents of which application are incorporated herein for all purposes by this reference.

TECHNICAL FIELD

The present disclosure relates, in general, to an emergency start method and system for a fuel cell-powered vehicle, which enable an emergency start of a fuel cell even if a power system, such as a high voltage battery, a converter, or the like, breaks down.

BACKGROUND

Generally, a fuel cell-powered vehicle or a fuel cell-hybrid vehicle, which has a fuel cell and a battery, starts with a supply of air using a high-voltage air blower. Here, the high-voltage air blower is driven with high voltage supplied from a high-voltage battery which outputs the high voltage boosted via a DC-DC converter. However, if the high-voltage battery or the DC-DC converter breaks down, it is impossible to start the fuel cell-powered vehicle or fuel cell-hybrid vehicle.

A fuel cell stack has a structure in which hundreds of sheets of cells, each consisting of a hydrogen-reactive layer as an anode and an oxygen-reactive layer as a cathode as are stacked on each other. When a power system stops operating, a supply of air stops so as to lower a voltage output from the fuel cell, and an electric current is consumed via the connection of a resistor or the charge of the battery using the DC-DC converter, thereby exhausting remaining oxygen in the cathode. Here, the cathode maintains a nitrogenous atmosphere.

However, as time elapses after the system stops operating, air is externally introduced into the cathode, gradually forming an oxygen-rich atmosphere. In this state, if the air blower fails to operate due to the breakdown of the DC-DC converter or the battery, the system of the fuel cell-powered vehicle cannot start. Thus, the fuel cell-powered vehicle has to be repaired.

The foregoing is intended merely to aid in the understanding of the background of the present disclosure, and is not intended to mean that the present invention falls within the purview of the related art that is already known to those skilled in the art.

SUMMARY

The present disclosure has been made keeping in mind the above problems occurring in the related art. The present disclosure provides an emergency start method and system for a fuel cell-powered vehicle, which enable an emergency start of a fuel cell even if a power system such as, a high voltage battery, a converter, or the like breaks down.

According to an exemplary embodiment of the present invention, an emergency start method for a fuel cell-powered vehicle includes starting the vehicle. An abnormal state of a power supply system of an air blower is detected upon the start of the vehicle. If the power supply system of the air blower is in the abnormal state, an air-check valve of a fuel cell opens. Hydrogen is supplied to the fuel cell, and the air blower operates with power generated from the fuel cell.

The detecting step may detect an abnormal state of a high-voltage battery or a converter connected to the high-voltage battery so as to supply power to the air blower.

The method may further include re-detecting an abnormal state of the power supply system of the air blower if the fuel cell stops.

The method may further include controlling the air-check valve of the fuel cell to be closed at a normal state of the power supply system and the air-check valve of the fuel cell to be opened at the abnormal state of the power supply system.

The method may further include checking the time elapsed after the fuel cell stops.

In the step of opening the air-check valve, the air-check valve may be opened when the fuel cell starts after a predetermined time elapses from the stoppage of the fuel cell.

According to another exemplary embodiment of the present invention, an emergency start system for a fuel cell-powered vehicle includes an air blower supplying air to a fuel cell and being powered directly from the fuel cell or powered from a high-voltage battery via a converter. An air-check valve is provided in an air-circulation line of the fuel cell. A hydrogen-supplier supplies hydrogen to the fuel cell. A controller is configured to detect an abnormal state of a power supply system of the air blower at the start of the fuel cell, to open the air-check valve of the fuel cell at the abnormal state of the power supply system, to supply hydrogen to the fuel cell, and to operate the air blower with the power produced from the fuel cell.

The air-check valve may be provided at an air inlet and an air outlet, respectively, of the fuel cell.

The controller may detect the abnormal state of the power supply system of the air blower by detecting an abnormal state of the high-voltage battery or the converter.

The controller may detect the abnormal state of the power supply system at the stoppage of the fuel cell.

The controller may close the air-check valve of the fuel cell at a normal state of the power supply system of the air blower and open the air-check valve of the fuel cell at the abnormal state of the power supply system.

The controller may check the time elapsed after the stoppage of the fuel cell, and if the power supply system of the air blower is in the abnormal state, the controller may open the air-check valve when the fuel cell starts after a predetermined time elapses from the stoppage of the fuel cell.

According to the emergency start method and system of the present disclosure, even if a power system such as, a high-voltage battery, a converter, or the like breaks down, an emergency start of a fuel cell can be obtained.

BRIEF DESCRIPTION OF THE DRAWINGS

The above and other objects, features and advantages of the present invention will be more clearly understood from the following detailed description when taken in conjunction with the accompanying drawings.

FIGS. 2 and 3 are flow charts showing an emergency start method for a fuel cell-powered vehicle according to an embodiment of the present invention.

DETAILED DESCRIPTION

Hereinbelow, an emergency power supply system for a fuel cell vehicle according to embodiments of the present invention will be described in detail with reference to the accompanying drawings.

Figure 1:
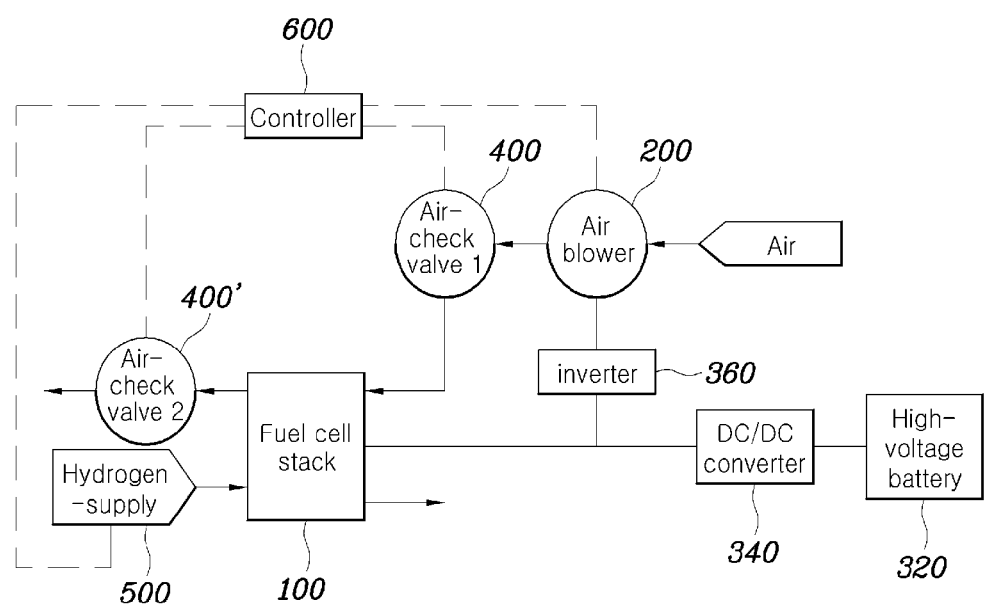
FIG. 1 is a block diagram showing an emergency start system for a fuel cell-powered vehicle according to an embodiment of the present invention.
Figure 2:
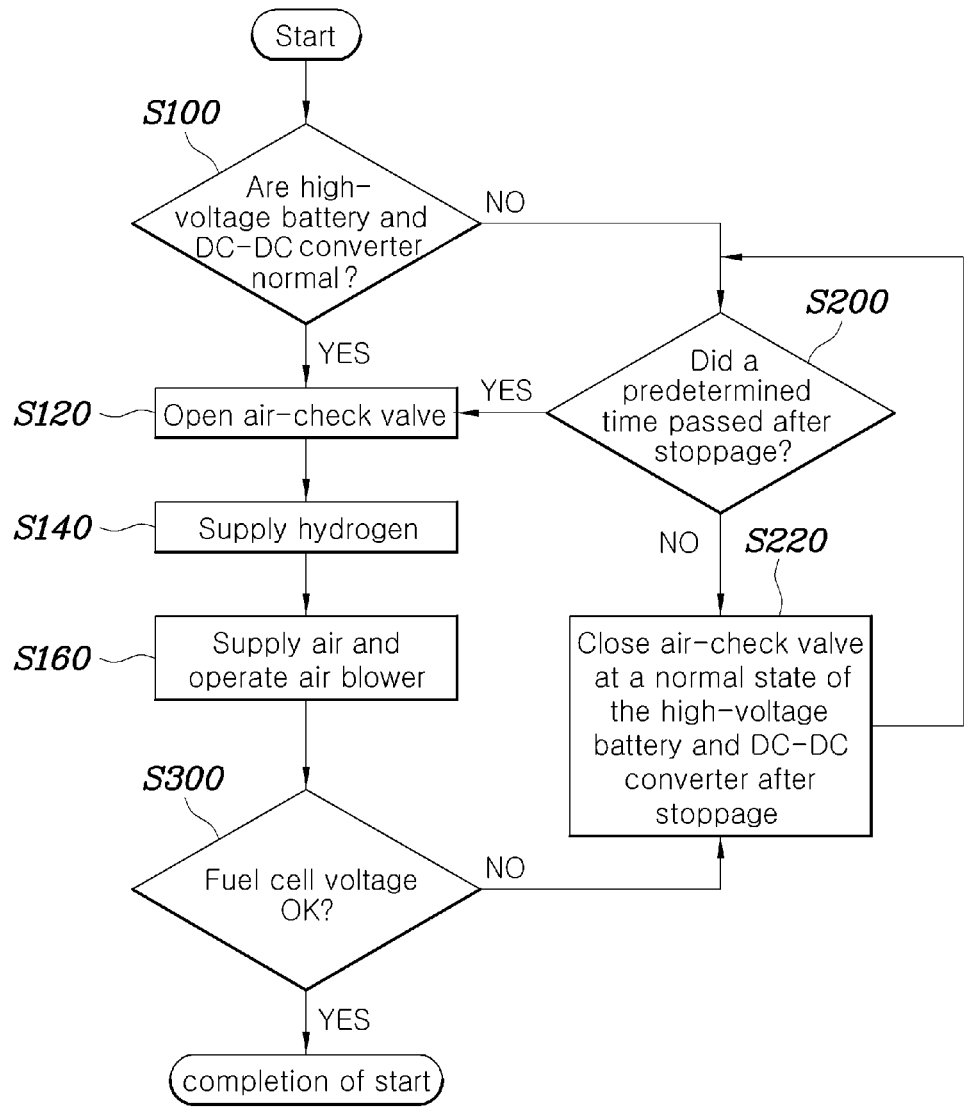

FIG. 1 is a block diagram showing an emergency start system for a fuel cell-powered vehicle according to an embodiment of the present invention. FIGS. 2 and 3 are flow charts showing an emergency start method for a fuel cell-powered vehicle according to an embodiment of the present invention.

A fuel cell stack has a structure in which hundreds of sheets of cells, each sheet consisting of a hydrogen-reactive layer as an anode and an oxygen-reactive layer as a cathode, are stacked on each other. When a power system stops operating, a supply of air is stopped to lower a voltage output from a fuel cell. An electric current is consumed via the connection of a resistor or the charge of a battery using a DC-DC converter, thereby exhausting remaining oxygen in the cathode. Here, the cathode maintains a nitrogenous atmosphere. However, as time elapses after the system stops, air is externally introduced into the cathode, gradually forming an oxygen-rich atmosphere. According to the present disclosure, the start sequence is improved such that, even if an air blower fails to operate due to a failure of the DC-DC converter or the battery, it is determined that a predetermined time has elapsed from the stoppage of a fuel cell without stopping the start of the fuel cell. When the fuel cell starts under an abnormal state of the DC-DC converter or the battery, hydrogen is supplied to an anode of the fuel cell stack so that the air blower activates with voltage received through a reaction of the hydrogen with the remaining oxygen in a cathode, thereby enabling the start of the fuel cell.

Further, the stoppage sequence of the fuel cell is improved such that in a system in which air-check valves are installed at both inlet and outlet of the cathode, respectively, in order to prevent the introduction of external air to the cathode after the fuel cell stops, when the abnormal state of the high-voltage battery or the DC-DC converter is detected upon the stoppage of the fuel cell, the air-check valve maintains an open state at the stoppage of the fuel cell to facilitate the easy introduction of external air. With the adaptation of such a technique, even upon the abnormal state of the high-voltage battery or the DC-DC converter, it is possible to perform an emergency start of the fuel cell after at most 3 to 4 hours from the stoppage of the fuel cell, since the cathode gradually becomes an oxygen-rich atmosphere. Further, upon the emergency start, whether a predetermined time has elapsed after the previous stoppage of the fuel cell is determined. If a supply of hydrogen is unconditionally carried out without such determination upon the emergency start, hydrogen is unnecessarily consumed or leaks out as the emergency start repeatedly performs.

As shown in FIG. 1, an emergency start system for a fuel cell-powered vehicle includes an air blower 200 which supplies air to a fuel cell 100 and is powered directly from the fuel cell 100 or from a high-voltage battery 320 via a DC-DC converter 340 and an inverter 360. An air-check valve 400 is provided in art air-circulation line of the fuel cell. A hydrogen-supplier 500 supplies hydrogen to the fuel cell. A controller 600 is configured to detect an abnormal state of a power supply system of the air blower 200 at the start of the fuel cell, to open the air-check valve 400 of the fuel cell at the abnormal state of the power supply system, supplying hydrogen to the fuel cell, and to operate the air blower 200 with the power produced from the fuel cell.

Referring to FIG. 2, an emergency start method for a fuel cell-powered vehicle according to another embodiment of the present invention includes starting the vehicle and detecting an abnormal state of a power supply system of the air blower 200 upon the start (S100). If the power supply system of the air blower 200 is in the abnormal state, the air-check valve 400 of a fuel cell is opened (S120). Hydrogen is supplied to the fuel cell (S140), and the air blower 200 operates with power generated from the fuel cell (S160).

The step of detecting the abnormal state (S100) may detect an abnormal state of the high-voltage battery 320 or a DC-DC converter 340 connected to the high-voltage battery 320 so as to supply power to the air blower 200.

During the abnormal state of the power supply system of the air blower 200, step S120 may open the air-check valve 400 of the fuel cell. Further, by simultaneously performing step S140 of supplying hydrogen to the fuel cell and step S160 of activating the air blower 200 using the power from the fuel cell, the fuel cell can emergency-starts so that the air blower 200 is directly activated with the power obtained from the emergency start, so as to start the fuel cell (S300). Although such a configuration badly affects durability of the fuel cell, the vehicle can travel to a service center through the emergency start function even upon failure of the fuel cell-powered vehicle.

As shown in FIG. 3, the method may further include, step S420 of, if the fuel cell stops (S400), re-detecting the abnormal state of the power supply system of the air blower 200.

In addition, the method may further include controlling the air-check valve 400 of the fuel cell to be closed at a normal state of the power supply system (S440) and to be opened at the abnormal state of the power supply system (S460). This is for opening the air-check valve 400 before failure of the fuel cell in order to prepare for a future re-start.

The method may further include checking the elapsed time period after the fuel cell stops. In the valve-opening step, the air-check valve 400 may be opened when the fuel cell starts after a predetermined time has elapsed from the stoppage of the fuel cell (S200).

As described before, if a supply of hydrogen is unconditionally carried out without such determination upon the emergency start, hydrogen is unnecessarily consumed or leaks out as the emergency start repeatedly performs. Accordingly, the emergency start sequence is carried out only when a sufficient time has elapsed so that the fuel cell is filled with air (S220). However, even when a predetermined time has not yet elapsed from the stoppage of the fuel cell, the air-check valve 400 is closed only at the normal state of the power supply system (e.g. the high-voltage battery 320 or the DC-DC converter 340).

The emergency start system for a fuel cell-powered vehicle includes the air blower 200 which supplies air to the fuel cell 100 and is powered directly from the fuel cell or from a high-voltage battery 320 via the DC-DC converter 340. The air-check valve 400 is provided in an air-circulation line of the fuel cell. A hydrogen-supplier 500 supplies hydrogen to the fuel cell. A controller 600 is configured to detect an abnormal state of the power supply system of the air blower 200 at the start of the fuel cell, to open the air-check valve 400 of the fuel cell at the abnormal state of the power supply system, to supply the hydrogen to the fuel cell, and to operate the air blower 200 with the power produced from the fuel cell.

Air-check valves 400 and 400' may be provided at an air inlet and an air outlet, respectively, of the fuel cell. The controller 600 may detect the abnormal state of the power supply system of the air blower 200 by detecting the abnormal state of the high-voltage battery 320 or the DC-DC converter 340.

Further, the controller 600 may detect the abnormal state of the power supply system when the fuel cell stops. The controller 600 may close the air-check valve 400 of the fuel cell at a normal state of the power supply system of the air blower 200 and open the air-check valve 400 of the fuel cell at the abnormal state of the power supply system. In addition, the controller 600 may check the time elapsed since the fuel cell has stopped. If the power supply system of the air blower 200 is in the abnormal state, the controller 600 may open the air-check valve 400 when the fuel cell starts after a predetermined time has elapsed since the fuel cell has stopped.

That is, during the abnormal state of the DC-DC converter 340 or the high-voltage battery 320, if the fuel cell re-starts after a predetermined length of time from the previous stoppage of the fuel cell elapses, a cathode maintains an oxygen-rich atmosphere. Thus, when hydrogen is supplied to an anode, a reaction between hydrogen and oxygen occurs so as to boost a voltage output from the fuel cell, which enables the air blower 200 to be activated, and completing the emergency start.

Further, in a system in which air-check valves are installed in order to prevent the introduction of external air to the cathode after the fuel cell stops, when an abnormal state of the high-voltage battery or the DC-DC converter is detected at the stoppage of the fuel cell, the air-check valves maintain an open state at the stoppage of the fuel cell to facilitate the easy introduction of external air.

The emergency start sequence is performed only when a predetermined length of time has passed with a means for counting a time from the stoppage to a future re-start of the fuel cell using a clock or the like in the controller, thereby preventing unnecessary consumption and leakage of hydrogen occurring upon repeated attempt of the emergency start.

According to the emergency start method and system of the present disclosure, even if a power system such as the high-voltage battery, the converter, or the like breaks down, the emergency start of the fuel cell can be obtained.

Although embodiments of the present invention has been described for illustrative purposes, those skilled in the art will appreciate that various modifications, additions and substitutions are possible, without departing from the scope and spirit of the invention as disclosed in the accompanying claims.

What is claimed is:

1. An emergency start method for a fuel cell-powered vehicle, the method comprising steps of:
    starting the vehicle;
    detecting a first state of a power supply system of an air blower upon the start of the vehicle;
    opening an air-check valve of a fuel cell if the power supply system of the air blower is in the first state;
    supplying hydrogen to the fuel cell;
    operating the air blower with power generated from the fuel cell;
    re-detecting the first state of the power supply system of the air blower after a stoppage of the fuel cell; and
    controlling the air-check valve of the fuel cell to be closed at a second state of the power supply system and the air-check valve of the fuel cell to be opened at the first state of the power supply system before a subsequent starting of the vehicle.

2. The emergency start method of claim 1, wherein the step of detecting detects a first state of a battery or a DC-DC converter connected to the battery to supply power to the air blower.

3. The emergency start method of claim 1, further comprising a step of checking the time elapsed after the fuel cell stops.

4. The emergency start method of claim 3, wherein in the step of opening the air-check valve, the air-check valve is opened when the fuel cell starts after a predetermined time elapses from the stoppage of the fuel cell.

5. An emergency start system for a fuel cell-powered vehicle, the system comprising:
    an air blower configured to supply air to a fuel cell and being powered directly from the fuel cell or powered from a battery via a converter;
    an air-check valve provided in an air-circulation line of the fuel cell;
    a hydrogen-supplier configured to supply hydrogen to the fuel cell; and
    a controller programmed to detect a first state of a power supply system of the air blower at a start of the fuel cell, to open the air-check valve of the fuel cell at the first state of the power supply system, to supply hydrogen to the fuel cell, and to operate the air blower with the power produced from the fuel cell,
    wherein the controller is programmed to re-detect the first state of the power supply system after a stoppage of the fuel cell, and
    wherein the controller is programmed to close the air-check valve of the fuel cell at a second state of the power supply system of the air blower and to open the air-check valve of the fuel cell at the first state of the power supply system before a subsequent starting of the vehicle.

6. The emergency start system of claim 5, wherein the air-check valve is provided at an air inlet and an air outlet, respectively, of the fuel cell.

7. The emergency start system of claim 5, wherein the controller is programmed to detect the first state of the power supply system of the air blower by detecting a first state of the battery or the converter.

8. The emergency start system of claim 5, wherein the controller is programmed to check the time elapsed after the fuel cell stops, and if the power supply system of the air blower is in the first state, the controller opens the air-check valve when the fuel cell starts after a predetermined time elapses from the stoppage of the fuel cell.

9. The emergency start system of claim 5, wherein the power supply system of the air blower includes a battery and a DC-DC converter.

* * * * *